Figure 1:
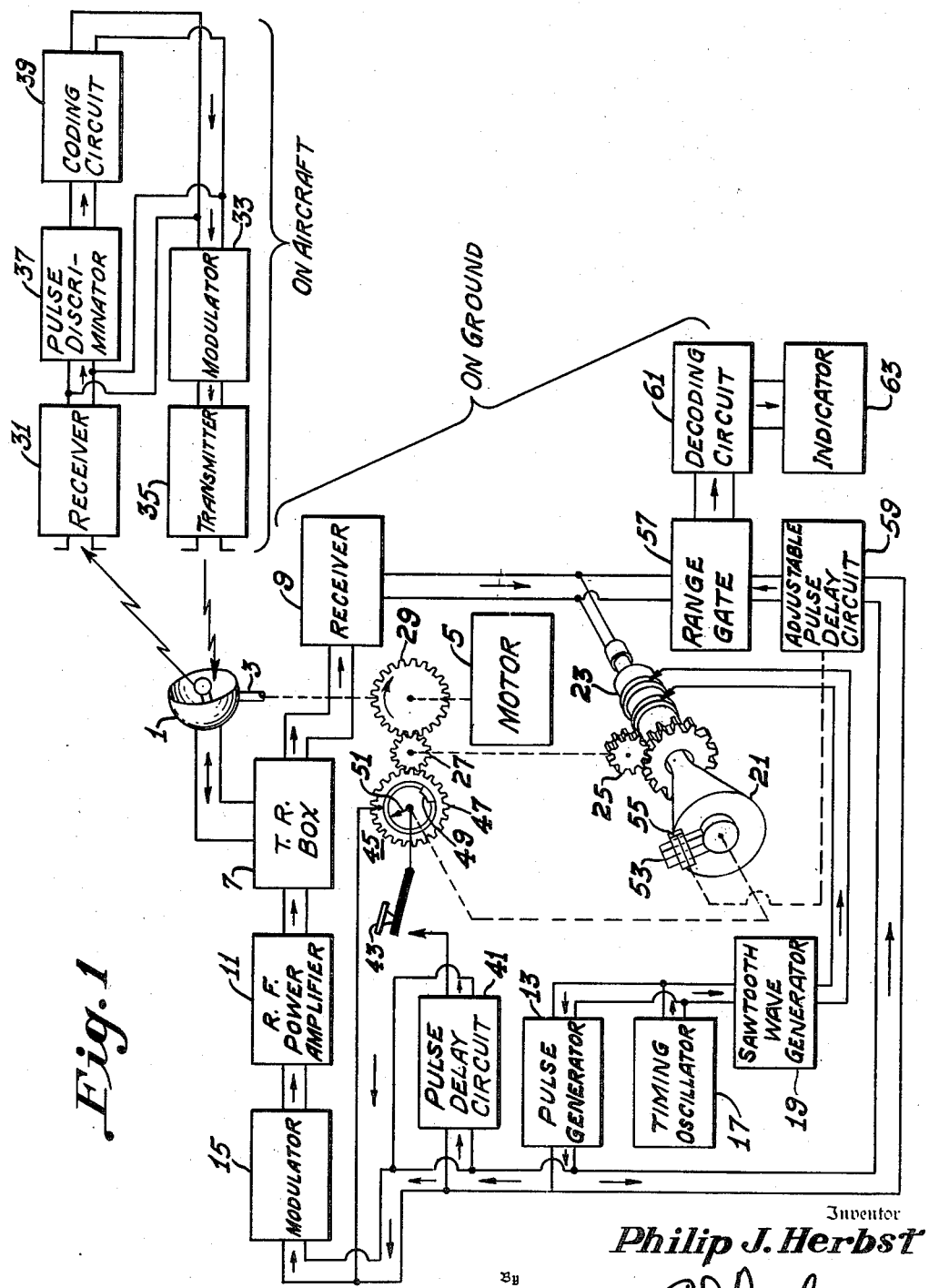

April 29, 1952  P. J. HERBST  2,595,141
RADIO SYSTEM FOR AIRCRAFT IDENTIFICATION
Filed Oct. 10, 1946  2 SHEETS—SHEET 1

Inventor
Philip J. Herbst
By
C. D. Luska
Attorney

April 29, 1952    P. J. HERBST    2,595,141
RADIO SYSTEM FOR AIRCRAFT IDENTIFICATION
Filed Oct. 10, 1946    2 SHEETS—SHEET 2
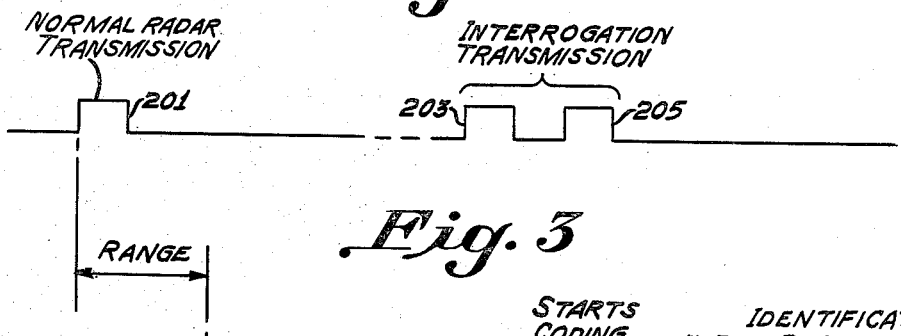
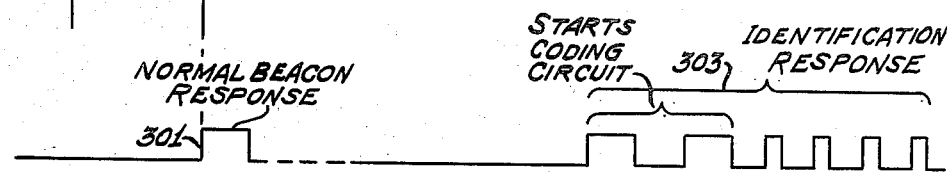
Inventor
Philip J. Herbst
By
Attorney Patented Apr. 29, 1952

2,595,141

UNITED STATES PATENT OFFICE 2,595,141

RADIO SYSTEM FOR AIRCRAFT IDENTIFICATION

Philip J. Herbst, Princeton, N. J., assignor to Radio Corporation of America, a corporation of Delaware Application October 10, 1946, Serial No. 702,423

2 Claims. (Cl. 343—6)

This invention relates to radar identification systems, and its principal object is to provide means for recognition of the craft corresponding to any selected spot or "pip" on a radar display.

The invention will be described with reference to the accompanying drawing, wherein:

Figure 1 is a schematic block diagram of a radar system of the pulse echo type, embodying the present invention, Figure 2 is a graph showing pulse signals emitted by the transmitter of the system of Figure 1, both for normal position indication and for interrogation of a selected craft, and Figure 3 is a graph showing the signals emitted by a relay or "responder" beacon borne by the craft, in response to the signals of Figure 2.

Refer to Figure 1. A directive antenna 1 is supported on a vertical shaft 3 for rotation in azimuth by a motor 5. The antenna 1 is connected through a duplexing circuit or "TR box" 7 to a receiver 9 and to a pulse transmitter, which includes a power amplifier 11 modulated with the output of a pulse generator 13 by a modulator 15. The pulse generator 13 is controlled by a timing oscillator 17 which also controls a sawtooth wave generator 19, so that a wave is initiated by the generator coincidentally with each pulse from the generator 13.

The output of the receiver 9 is applied to the beam intensity control electrode of a cathode ray oscilloscope tube 21. The tube 21 is provided with a rotatable deflection yoke 23, connected through slip rings and brushes to the sawtooth wave generator 19, and coupled through gears 25, 27 and 29 to the antenna shaft 3. The yoke 23 rotates in synchronism with the antenna 1, so that the direction of deflection of the cathode ray beam radially of the face of the tube 21 corresponds at all times to the azimuth of the directional axis of the antenna 1.

The system thus far described is a radar of the plan position indicator (so-called P. P. I.) type, and it operates as follows:

The antenna 1 and the deflection yoke 23 are rotated by the motor continuously at a rate for example six revolutions per minute. The pulse generator 13, under the control of the timing oscillator 17, provides perhaps 1000 pulses per second, which cause the emission of corresponding pulses of radio frequency energy from the antenna 1. Starting with each pulse from the generator 13, the sawtooth wave generator 19 energizes the deflection yoke 23 to produce a radial sweep of the cathode ray beam of the tube 21. The beam is normally biassed off so that it produces little or no luminescense of the screen on the face of the tube 21.

Whenever the directive beam of the antenna 1 strikes a reflecting object, and more particularly a craft equipped with a responder beacon, as described hereinafter, each transmitted pulse is reflected back to the antenna 1, arriving there at a time after transmission which depends on the distance of the object from the antenna 1. The returned pulses are detected and amplified in the receiver 9, and applied to the tube 21 in such polarity as to oppose or overcome the bias. Thus each received pulse momentarily increases the intensity of the cathode ray beam, producing a luminous spot or "pip" on the screen of the tube 21. The angular position of the pip with respect to a radial reference line corresponds to the azimuth of the reflecting object. The radial position, i. e. the distance from the center of the screen, depends on the distance of the object. Thus the system affords a map-like plan view of all reflecting objects within range.

According to the present invention, each craft which is to be identifiable is provided with a responder beacon, comprising a receiver 31, a modulator 33, and a transmitter 35. The receiver 31 responds to signals sent out by the radar antenna 1, and its output is used to modulate the transmitter 35, which retransmits the signals. The signals returned to the radar station by a craft so equipped are much stronger than the echoes ordinarily provided by reflection alone, and tend to aid in overcoming the effects of ground reflection and other extraneous signals. The beacon also includes a pulse discriminator 37 and a coding circuit 39, to be described later.

At the radar station, a pulse delay circuit 41 is connected to the pulse generator 13, and through switches 43 and 45 to the modulator 15. The switch 43 is merely a key or pushbutton switch. The switch 45 includes a gear 47 meshing with the pinion 27 to rotate in synchronism with the antenna shaft 3. The gear 47 carries a contact 49, connected through a slip ring and brush to the modulator 15. A contact 51, connected to the key 43, engages the contact 49 for a brief interval during each revolution of the gear 47. The angular position of the contact 51 controls the direction in which the antenna 1 points when the switch 45 is closed.

The contact 51 is mechanically coupled to a transparent arm 53 pivotally mounted and extending radially from the center of the screen of the tube 21. A hairline or similar index is provided on the arm 53 so that it may be positioned to extend through any selected pip on the screen. The arm 53 supports a radially slidable cursor, also provided with a hairline.

The output of the receiver 9, in addition to being applied to the tube 21, also goes to a range gate 57. The range gate 57 may be merely an amplifier normally biassed off. Output from the pulse generator 13 is applied to the gate 57 through an adjustable pulse delay circuit 59, so that the bias is overcome and the range gate 57 is turned on at a predetermined time after the generation of each pulse by the generator 13.

The delay introduced by the delay circuit 59 is manually adjustable, and its adjustment is mechanically ganged with the cursor 55, so that when the hairline is placed over a pip on the screen of the tube 21, the range gate opens substantially coincidentally with the reception of each pulse corresponding to that particular pip. The output of the range gate 57 is applied to a decoding circuit 61, which is provided with an indicator 63.

The decoding circuit 61 may be a pulse counter, a teletype decoder, or other device for automatically interpreting groups of pulses in accordance with a predetermined code. The coding circuit 39 on the beacon comprises means for generating, in response to a control pulse, a short train of pulses characteristically spaced or coded. Each responder beacon is set up to provide a different signal, individual to the particular craft.

The pulse discriminator 37 provides no output in response to the normal radar pulses, but does produce a pulse when excited by a special interrogation signal, such as a double pulse or a wide pulse. This may be effected by means of an integrating circuit and peak clipper, or any of various expedients known to those skilled in the art.

The operation of the described system is as follows:

The radar operator adjusts the arm 53 and the cursor 55 to make the crossed hairlines intersect over the pip corresponding to the craft he wishes to identify, then closes the switch 43. When the antenna 1 points toward said craft, the switch 45 closes. This completes the connection of the pulse delay circuit 41 as a parallel path between the pulse generator 13 and the modulator 15, causing an additional pulse to reach the modulator shortly after each pulse gets there directly from the pulse generator. Refer to Figure 2, where the pulse 201 is a normal radar transmission, and 203 and 205 comprise a double pulse interrogation signal.

As long as the switch 43 is held closed, the interrogation signals are repeatedly transmitted, but substantially only in the direction of the craft being interrogated. These signals are picked up and sent back by the beacon, exactly like the normal radar pulses. In addition, the pulse discriminator 37 responds to the double pulse and activates the coding circuit 39 to send back a signal characteristic of the particular beacon. Figure 3 shows at 301 the beacon response to normal radar pulses, and at 303 a typical beacon response to interrogation signals.

The range gate 57 opens (i. e. allows signals to pass through) substantially only during the time the identification response from the beacon is being received. Thus, although any other craft on the same bearing from the radar station will receive the interrogation signal and respond characteristically, only the response from the selected craft (at the range corresponding to the adjustment of the cursor 55) will be applied to the decoding circuit 61. The decoding circuit 61 actuates the indicator 63 to provide a visual display identifying the craft. The radar indicator system operates in normal fashion during interrogation and identification, showing the position of the selected craft as well as those of all other craft within range.

I claim as my invention:

1. An identification system for mobile craft, comprising, on each craft to be identifiable, a responder beacon including a transmitter, a modulator connected to said transmitter, and a receiver; means for applying output from said receiver directly to said modulator, a coding circuit connected to said modulator to effect transmission of a coded signal characteristic of the particular craft, and means responsive to reception by said receiver of a special interrogation signal to activate said coding circuit only when said interrogation signal is received; a radar station on the ground including means with a radar transmitter for directionally transmitting signals to said beacons, and means for receiving said signals after retransmission by said beacons, means for indicating azimuth of said directional transmission and the delay with respect thereto in reception of said retransmitted signals, thereby showing the ranges and bearings of said beacons from said station; means for generating said interrogation signals, means for applying said signals to said radar transmitter only when said transmitter transmits in a selected direction and not when said transmitter transmits in other directions; a decoding circuit, and means for applying output from said radar receiver to said decoding circuit only upon reception of signals retransmitted thereto from a beacon at a selected range, and indicator means connected to said decoding circuit and responsive thereto to provide identification of a craft at said selected range and in said selected direction from said radar station.

2. The system claimed in claim 1, said indicating means showing the ranges and bearings of said beacons from said station on a plan position indicator, a cursor movable to a position over said indicator corresponding to a selected target, means mechanically connected to said cursor for selecting the direction of said radar transmitter when interrogation signals are applied by said applying means to coincide substantially with said selected target.

PHILIP J. HERBST.

REFERENCES CITED

The following references are of record in the file of this patent:

UNITED STATES PATENTS

| Number | Name | Date |
|---|---|---|
| 2,134,716 | Gunn | Nov. 1, 1938 |
| 2,252,083 | Luck | Aug. 12, 1941 |
| 2,406,316 | Blumlein et al. | Aug. 27, 1946 |
| 2,427,905 | Fyler | Sept. 23, 1947 |
| 2,433,381 | Marchand | Dec. 30, 1947 |
| 2,444,452 | Labin | July 6, 1948 |
| 2,448,016 | Busignies | Aug. 31, 1948 |
| 2,453,970 | Charrier | Nov. 16, 1948 |
| 2,459,811 | Grieg | Jan. 25, 1949 |

FOREIGN PATENTS

| Number | Country | Date |
|---|---|---|
| 116,666 | Australia | Oct. 10, 1941 |
| 116,667 | Australia | Oct. 10, 1941 |